US012181572B1

United States Patent
Qian et al.

(10) Patent No.: US 12,181,572 B1
(45) Date of Patent: Dec. 31, 2024

(54) SCATTERING APERTURE IMAGING METHOD AND DEVICE, SYSTEM, AND STORAGE MEDIUM

(71) Applicant: UNIVERSITY OF ELECTRONIC SCIENCE AND TECHNOLOGY OF CHINA, Chengdu (CN)

(72) Inventors: Jiang Qian, Chengdu (CN); Jiayang Wu, Fuzhou (CN); Haitao Lyu, Huzhou (CN); Guangcai Sun, Xi'an (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 18/652,208

(22) Filed: May 1, 2024

(30) Foreign Application Priority Data

Jan. 26, 2024 (CN) .......................... 202410111475.1

(51) Int. Cl.
*G01S 13/90* (2006.01)
*G01S 7/295* (2006.01)

(52) U.S. Cl.
CPC ......... *G01S 13/9011* (2013.01); *G01S 7/2955* (2013.01)

(58) Field of Classification Search
None
See application file for complete search history.

(56) References Cited

U.S. PATENT DOCUMENTS 10,564,277 B2 * 2/2020 Hong ................... G01S 13/003
11,006,383 B2 * 5/2021 Trichopoulos ............ G01S 5/14

OTHER PUBLICATIONS

Zhang, Fubo; Yang, Yaqian; Chen, Longyong; Yang, Ling. "Building 3D reconstruction of TomoSAR using multiple bounce scattering model." Jun. 2022, Wiley, vol. 58 No. 12, pp. 486-488 (Year: 2022).*
Rabaste, Olivier; Colin-Koeniguer, Elise; Poullin, Dominique; Cheraly, Anil; Petex, Jean-Francois; Phan, Huy-Khang. "Around-the-corner radar: detection of a human being in non-line of sight." IET Radar Sonar Navigation. 2015, vol. 9, Issue 6, pp. 660-668. (Year: 2015).*
CNIPA, Notification of First Office Action for CN202410111475.1, Mar. 6, 2024.
Yangtze Delta Region Institute of University of Electronic Science and Technology ofChina (Huzhou) (Applicant), Reply to Notification of First Office Action for CN202410111475.1, w/ (allowed) replacement claims, Mar. 15, 2024.
CNIPA, Notification to grant patent right for invention in CN202410111475.1, Mar. 22, 2024.

* cited by examiner

*Primary Examiner* — Vladimir Magloire
*Assistant Examiner* — David C. Schultz

(57) ABSTRACT

Provided are a scattering aperture imaging method and a device, a system and a storage medium. The method mainly includes four steps of scattering point position estimation, azimuth resampling, range compensation and synthetic aperture radar imaging. A phased array radar with a fixed position is used for NLOS imaging, and the radar can control a beam to scan in space, which is equivalent to a scattering aperture moving along a relay surface. Therefore, the method can realize converting NLOS imaging into LOS synthetic aperture radar imaging, which can be suitable for the situation that a relay surface is rough and the relay surface with more complicated surface condition, thus widening the application range of radar NLOS imaging.

10 Claims, 7 Drawing Sheets

SCATTERING APERTURE IMAGING METHOD AND DEVICE, SYSTEM, AND STORAGE MEDIUM

TECHNICAL FIELD

The disclosure relates to the field of non-line-of-sight (NLOS) technologies of a phased array radar under a three-time reflection model, particularly to a scattering aperture imaging method and device, a system, and a storage medium.

BACKGROUND

NLOS imaging is a technology to study how to image an area that a radar signal cannot reach directly. There are many different models of the NLOS imaging, and what the disclosure is going to study is a three-time reflection model (as shown in FIG. 1). In this model, a signal transmitted by a radar R reaches an object O after one reflection on a relay surface S, and an echo reflected by the object O is received by the radar R after a further reflection on the relay surface S.

Due to the limitations, such as directivity of the radar directivity, there is little research on NLOS imaging of radar under the three-time reflection model. In 2021, Jinshan Wei et al. modeled and studied a propagation path of a radar signal under the condition of a specular reflection relay surface; and based on a positional relationship between an object and a virtual image of the object under a specular reflection model, proposed a mirror symmetric back projection algorithm (MSBP algorithm). In addition to the traditional imaging algorithm, Xinyuan Liu et al. introduced compressed sensing into NLOS imaging of radar, and put forward the mirror symmetric coefficient total variation algorithm (MSSTV algorithm), and realized three-dimensional reconstruction of NLOS.

The existing radar NLOS imaging technology under the three-time reflection model has strict requirements on the relay surface, the relay surface is regarded as an ideal smooth plane, and the reflection of a radar signal is required to be a specular reflection. It is not suitable for the situation that the relay surface is rough and there are diffuse reflection components in the reflection of the radar signal.

SUMMARY

The disclosure is provided to solve the above problems existing in the related art. Therefore, there is a need for a scattering aperture imaging method and device, a system and a storage medium for NLOS imaging of a phased array radar under the condition of a rough relay surface.

In a first aspect, an embodiment of the disclosure provides a scattering aperture imaging method, which includes: estimating a position of a main scatterer; performing, based on the position of the main scatterer, azimuth resampling through interpolation, to obtain sampling points showing a uniform linear array in an azimuth direction; performing range compensation on a radar signal, to make a signal propagation path of the radar signal become the main scatterer→an object→the main scatterer; and performing synthetic aperture radar (SAR) imaging to obtain NLOS scene images.

In an embodiment, the estimating the position of the main scatterer includes: estimating, based on each pulse of echoes of a relay surface, an azimuth angle of the main scatterer relative to a radar, i.e., phased array radar, and a range of the main scatterer relative to the radar, to thereby obtain a position estimation value of the main scatterer.

In an embodiment, the estimating, based on each pulse of echoes of a relay surface, an azimuth angle of the main scatterer relative to a radar and a range of the main scatterer relative to the radar, to thereby obtain a position estimation value of the main scatterer includes: estimating, based on each pulse of the echoes of the relay surface, the azimuth angle of the main scatterer relative to the radar and the range of the main scatterer relative to the radar by using a sum-difference beam method and a multiple signal classification (MUSIC) algorithm, to thereby obtain the position estimation value of the main scatterer.

In an embodiment, the performing, based on the position of the main scatterer, azimuth resampling through interpolation, to obtain sampling points showing a uniform linear array in an azimuth direction, includes:
performing the azimuth resampling with a sampling interval satisfying a formula 1:

$$\Delta x < \frac{\lambda}{2}, \tag{1}$$

where $\Delta x$ represents the sampling interval, and $\lambda$ represents a wavelength of the radar signal.

In an embodiment, the performing range compensation on a radar signal, to make a signal propagation path of the radar signal become the main scatterer→an object→the main scatterer includes:
dividing the signal propagation path of the radar signal into two segments including: the radar→the main scatterer→the radar; and the main scatterer→the object→the main scatterer; where a range between the radar and the main scatterer is denoted as $x_1$, a range between the main scatterer and the object is denoted as $x_2$, and a range from the radar to the main scatterer and then to the object is denoted as x, which is expressed in a formula 2:

$$x = x_1 + x_2 \tag{2},$$

where an echo s(t) of a de-frequency modulation linear frequency modulation (LFM) signal after three reflections is expressed as a formula 3:

$$s(t) = \exp(2j\pi f_c(t_1 + t_2) - j\pi K_r t_1^2 - j\pi K_r t_2^2 + 2j\pi K_r t t_1 + 2j\pi K_r t t_2 - 2j\pi K_r t_1 t_2) \tag{3},$$

where $f_c$ represents a radar carrier frequency, $K_r$ represents a modulation frequency of an LFM signal, t represents a time, $t_1$ represents a propagation time of the radar signal between the radar and the main scatterer, and $t_2$ represents a propagation time of the radar signal between the main scatterer and the object;
where $t_1$ and $x_1$ satisfies a relationship expressed in a formula 4, and $t_2$ and $x_2$ satisfies a relationship expressed in a formula 5:

$$t_1 = \frac{2x_1}{c}; \tag{4}$$

$$t_2 = \frac{2x_2}{c}, \tag{5}$$

where c represents a speed of light;
constructing a range compensation term x(t) of the echo s(t), which is expressed in a formula 6:

$$x(t) = \exp(-2j\pi f_c t_1 + j\pi K_r t_1^2 - 2j\pi K_r t t_1) \tag{6},$$

multiplying the range compensation term with the echo in a time domain to obtain the echo after range compensation s'(t) expressed in a formula 7:

$$s'(t)=s(t)x(t)=\exp(2j\pi f_c t_2 - j\pi K_r t_2^2 + 2j\pi K_r t t_2 - 2j\pi K_r t_1 t_2) \quad (7),$$

where the formula 7 has no related term of $t_1$ excepting a complex constant term $\exp(-2j\pi K_r t_1 t_2)$, and s'(t) is consistent with the de-frequency modulation LFM signal with a time delay of $t_2$ in the form;

constructing a compensation term $h_n$ expressed in a formula 8 for an echo with an azimuth index n after range compensation:

$$h_n = \exp\left(4j\pi \frac{x_n - \bar{x}}{\lambda}\right), \quad (8)$$

where $\lambda$ represents a wavelength of the radar signal, $x_n$ represents a position of the main scatterer in a range direction corresponding to the echo with the azimuth index n, and $\bar{x}$ represents an average position of the main scatterer in the range direction;

multiplying the echo after range compensation s'(t) by the corresponding compensation term $h_n$, to thereby compensate the main scatterer to a plane $x=\bar{x}$.

In an embodiment, after the performing range compensation, a non-line-of-sight (NLOS) imaging problem of a phased array radar is transformed into a line-of-sight (LOS) imaging problem of a synthetic aperture radar, and the performing synthetic aperture radar imaging includes: performing the synthetic aperture radar imaging by using a synthetic aperture radar imaging algorithm In a second aspect, an embodiment of the disclosure provides a scattering aperture imaging method device, which includes: a position estimation module, configure to estimate a position of a main scatterer; a resampling module, configured to perform, based on the position of the main scatterer, azimuth resampling through interpolation, to obtain sampling points showing a uniform linear array in an azimuth direction; a compensation module, configured to perform range compensation on a radar signal, to make a signal propagation path of the radar signal become the main scatterer→an object→the main scatterer; and an imaging module, configured to perform synthetic aperture radar imaging.

In an embodiment, the compensation module is further configured to:

divide the signal propagation path of the radar signal into two segments including: the radar→the main scatterer→the radar; and the main scatterer→the object→the main scatterer; where a range between the radar and the main scatterer is denoted as $x_1$, a range between the main scatterer and the object is denoted as $x_2$, and a range from the radar to the main scatterer and then to the object is denoted as x, which is expressed in a formula 2:

$$x=x_1+x_2 \quad (2),$$

where an echo s(t) of a de-frequency modulation linear frequency modulation (LFM) signal after three reflections is expressed as a formula 3:

$$s(t)=\exp(2j\pi f_c(t_1+t_2)-j\pi K_r t_1^2 - j\pi K_r t_2^2 + 2j\pi K_r t t_1 + 2j\pi K_r t t_2 - 2j\pi K_r t_1 t_2) \quad (3),$$

where $f_c$ represents a radar carrier frequency, $K_r$ represents a modulation frequency of an LFM signal, t represents a time, $t_1$ represents a propagation time of the radar signal between the radar and the main scatterer, and $t_2$ represents a propagation time of the radar signal between the main scatterer and the object;

where $t_1$ and $x_1$ satisfies a relationship expressed in a formula 4, and $t_2$ and $x_2$ satisfies a relationship expressed in a formula 5:

$$t_1 = \frac{2x_1}{c}; \quad (4)$$

$$t_2 = \frac{2x_2}{c}, \quad (5)$$

where c represents a speed of light;

construct a range compensation term x(t) of the echo s(t), which is expressed in a formula 6:

$$x(t)=\exp(-2j\pi f_c t_1 + j\pi K_r t_1^2 - 2j\pi K_r t t_1) \quad (6),$$

multiply the range compensation term with the echo in a time domain to obtain the echo after range compensation s'(t) expressed in a formula 7:

$$s'(t)=s(t)x(t)=\exp(2j\pi f_c t_2 - j\pi K_r t_2^2 + 2j\pi K_r t t_2 - 2j\pi K_r t_1 t_2) \quad (7),$$

where the formula 7 has no related term of $t_1$ excepting a complex constant term $\exp(-2j\pi K_r t_1 t_2)$, and s'(t) is consistent with the de-frequency modulation LFM signal with a time delay of $t_2$ in the form;

construct a compensation term $h_n$ expressed in a formula 8 for an echo with an azimuth index n after range compensation:

$$h_n = \exp\left(4j\pi \frac{x_n - \bar{x}}{\lambda}\right), \quad (8)$$

where $\lambda$ represents a wavelength of the radar signal, $x_n$ represents a position of the main scatterer in a range direction corresponding to the echo with the azimuth index n, and $\bar{x}$ represents an average position of the main scatterer in the range direction;

multiply the echo after range compensation s'(t) by the corresponding compensation term $h_n$, to thereby compensate the main scatterer to a plane $x=\bar{x}$.

In a third aspect, an embodiment of the disclosure provides multi-user modulation classification system, which includes: a memory with a computer program stored therein; and a processor, configured to execute the computer program to implement the scattering aperture imaging method described above.

In a fourth aspect, an embodiment of the disclosure provides a readable storage medium with one or more programs stored therein, the one or more programs, when executed by one or more processors, is configured to implement the scattering aperture imaging method described above.

The disclosure has at least the following beneficial effects.

1. The disclosure utilizes the characteristic that there is a diffuse reflection component during scattering of a radar signal by a rough relay surface, and puts forward the concept of a scattering aperture, which links the NLOS imaging problem with the LOS imaging problem.

2. The disclosure uses two steps, namely azimuth resampling and range compensation, to process in azimuth and range dimensions respectively, so as to transform the NLOS imaging problem of a phased array radar into the NLOS imaging problem of a synthetic aperture radar.

3. The disclosure is suitable for the condition that the relay surface is rough, and can adapt to the relay surface with more complicated surface condition, thus widening the application range of radar NLOS imaging.

BRIEF DESCRIPTION OF DRAWINGS

FIG. 8A and FIG. 8B illustrate echo comparison before and after range compensation based on a constructed range compensation term according to the position of the main scatterer according to the embodiment of the disclosure, in which FIG. 8A illustrates the echo before range compensation and FIG. 8B illustrates the echo after the range compensation.

DETAILED DESCRIPTION OF EMBODIMENTS

In order to make the skilled in the art better understand the technical solutions of the disclosure, the disclosure will be described in detail in combination with the accompanying drawings and specific embodiments. The embodiments of the disclosure will be described in further detail below in combination with the accompanying drawings and specific examples, but the embodiments of the disclosure are not taken as limitations of the disclosure. If steps described in the disclosure are not necessarily related to each other, the order in which the steps are described as examples in the disclosure should not be regarded as a limitation, and the skilled in the art should know that the steps can be adjusted in order, as long as the logic between the steps is not destroyed and the adjustment does not make the whole process impossible.

Figure 1:
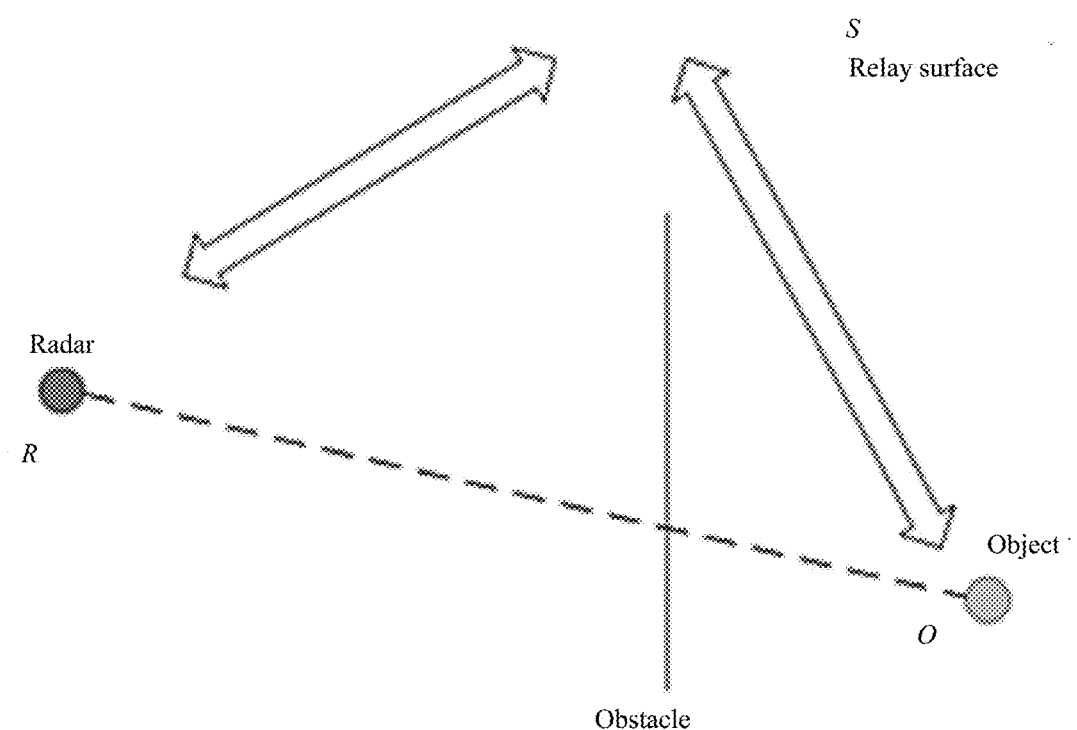
FIG. 1 illustrates a schematic view of a three-time reflection model.
Figure 2:
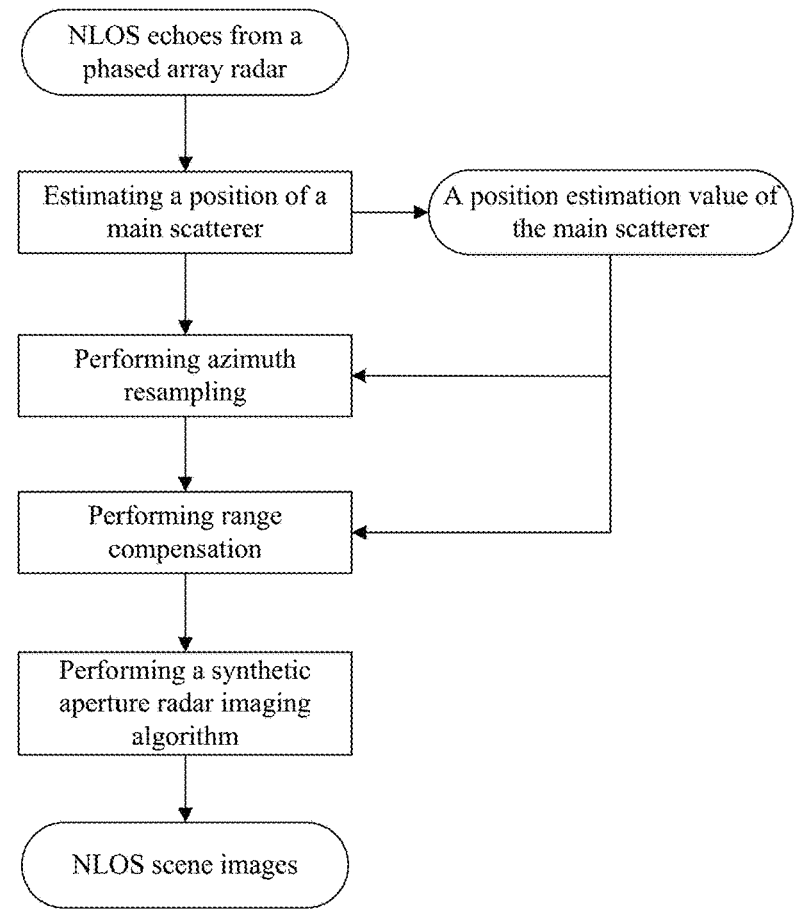
FIG. 2 illustrates an overall flow chart of a scattering aperture imaging method according to an embodiment of the disclosure.
Figure 3:
FIG. 3 illustrates a schematic view of an experimental scenario according to an embodiment of the disclosure.

FIG. 2 illustrates an overall flow chart of a scattering aperture imaging method according to an embodiment of the disclosure. As shown in FIG. 2, an embodiment of the disclosure provides a scattering aperture imaging method, which is used for NLOS imaging with a rough surface as a relay surface. As shown in FIG. 3, in an imaging scenario of this embodiment, a phased array radar faces a rough relay surface. Since reflected signals from the rough relay surface can directly reach an object and the phased array radar and these reflected signals can propagate in many directions, a projection of a beam main lobe of the phased array radar on the rough relay surface can be regarded as a virtual aperture, i.e., a scattering aperture.

In the disclosure, a phased array radar with a fixed position is used for NLOS imaging, the phased array radar can control a beam to scan in space, which is equivalent to the scattering aperture moving along the relay surface. Therefore, the disclosure can realize converting NLOS imaging into line-of-sight (LOS) synthetic aperture radar imaging.

The method includes four steps: estimating a position of a main scatterer, performing azimuth resampling, performing range compensation, and performing synthetic aperture radar imaging. With reference to FIG. 2, the method is described in detail as follows. Specifically, in a situation that a phased array radar faces towards a rough relay surface, a projection of a beam main lobe of the phased array radar on the rough relay surface is regarded as a virtual aperture, and scattering of a radar signal on the virtual aperture is equivalent to scattering of the radar signal occurring at one scattering point in the virtual aperture. In this case, the virtual aperture is taken as a scattering aperture and the one scattering point is taken as a main scatterer.

In step 1, a position of a main scatterer is estimated.

Through a beamforming technology, a main beam lobe of a phased array radar is relatively narrow, and a dimension of a scattering aperture can be regarded as a point in processing accordingly. In the disclosure, the scattering of radar signals on the relay surface is regarded as the scattering by a main scatterer.

Because of a higher roughness of the relay surface, the main scatterer is not necessarily located in an ideal position, i.e., an intersection of an ideal plane and a beam center line, so it is necessary to estimate the position of the main scatterer.

In an embodiment, according to each pulse of echoes of the relay surface, an azimuth angle of the main scatterer relative to a radar and a range of the main scatterer relative to the radar are estimated by using a sum-difference beam method and a multiple signal classification (MUSIC) algorithm, to thereby obtain a position estimation value of the main scatterer.

Figure 4:
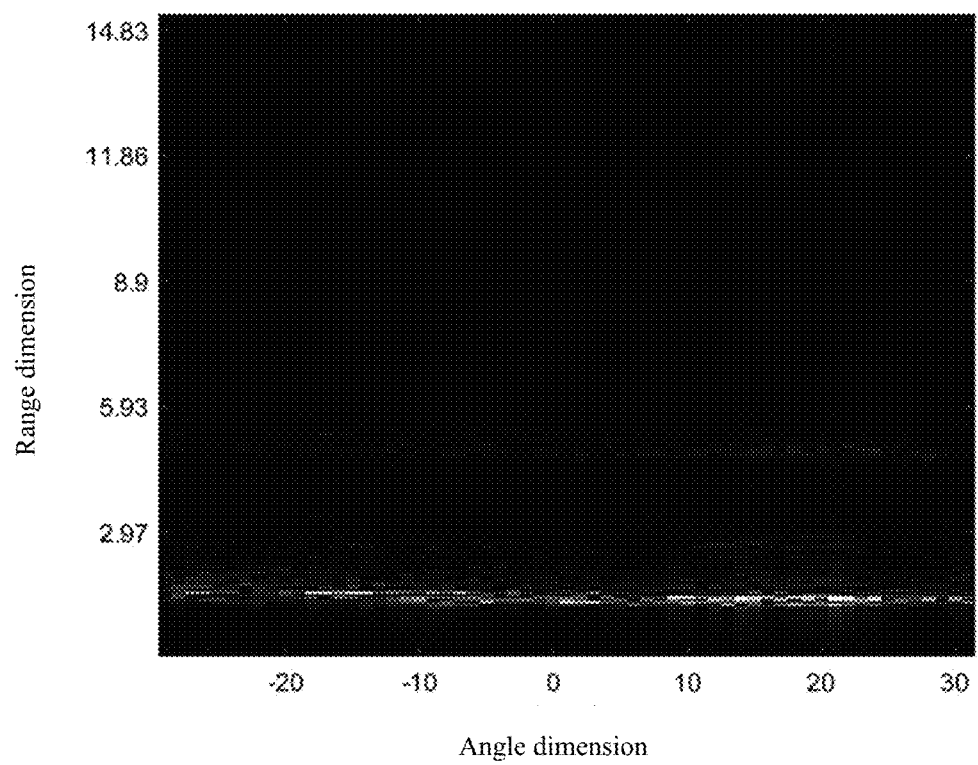
FIG. 4 illustrates an NLOS echo after range compression according to an embodiment of the disclosure, in which, an echo of the relay surface is mainly shown.
Figure 5:
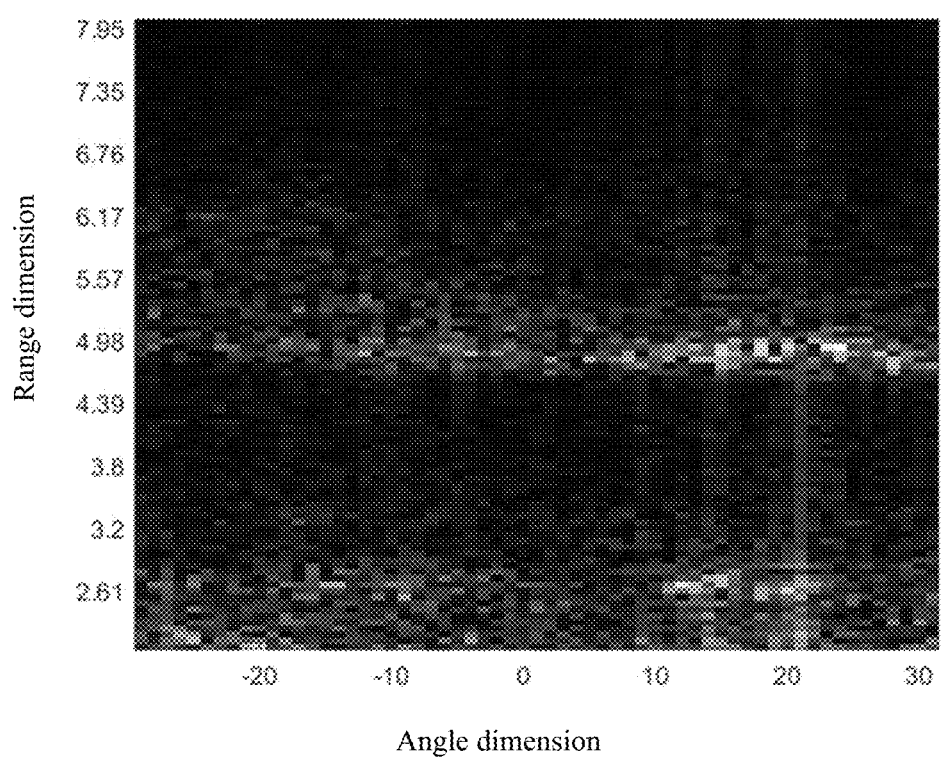
FIG. 5 illustrates an NLOS echo after range compression according to an embodiment of the disclosure, in which, the echo of the relay surface is cut off.
Figure 6:
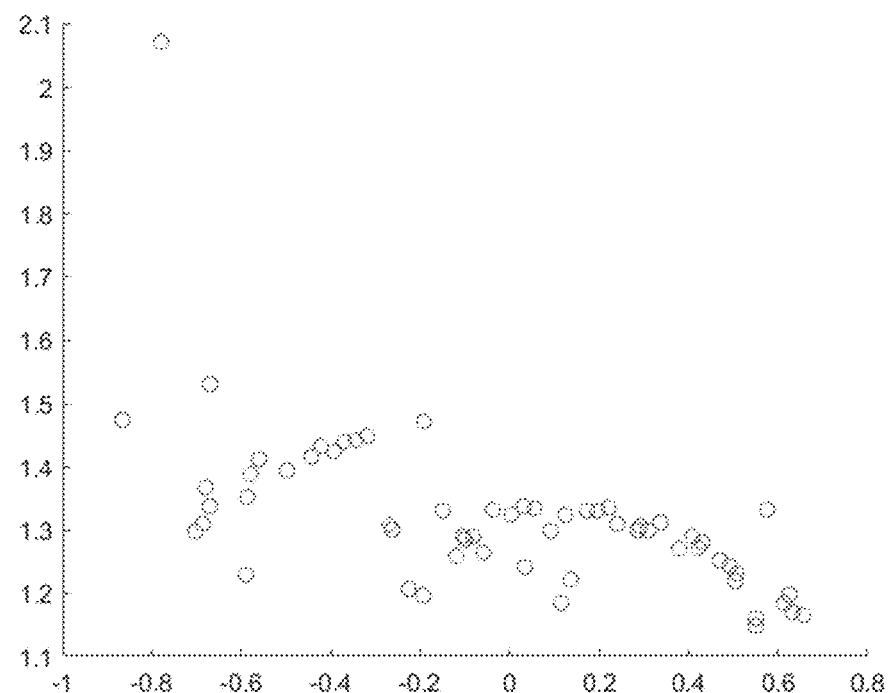
FIG. 6 illustrates a position estimation value of a main scatterer according to an embodiment of the disclosure.

Based on the experimental scenario shown in FIG. 3, FIG. 4 illustrates an NLOS echo after range compression, which mainly shows an echo of the relay surface itself. As shown in FIG. 5, an NLOS echo after range compression with the echo of the relay surface cut off is shown. An echo of the object (a guide rail) is shown in a lower right corner of FIG. 5, and echoes of iron railings and glass walls are shown in the range. A result (i.e., the position estimation value of the main scatterer) of position estimation of the main scatterer is shown in FIG. 6.

In step 2, azimuth resampling is performed.

According to an imaging theory of synthetic aperture radar, an array of sampling points should be a uniform linear array in an azimuth direction, and a sampling interval $\Delta x$ should satisfy a formula 1:

$$\Delta x < \frac{\lambda}{2}, \tag{1}$$

where $\lambda$ represents a wavelength of a radar signal.

However, in general, the scanning of a phased array radar system is equiangular scanning (beam direction angle intervals between different pulses are equal), and a scanning angle interval is larger. This leads to undersampling and non-uniform sampling of the signals in the azimuth direction. The disclosure uses interpolation to resample the collected signals in the azimuth direction, so that the signals can meet the requirements of the imaging theory of synthetic aperture radar for azimuth sampling points in the azimuth direction.

Figure 7:
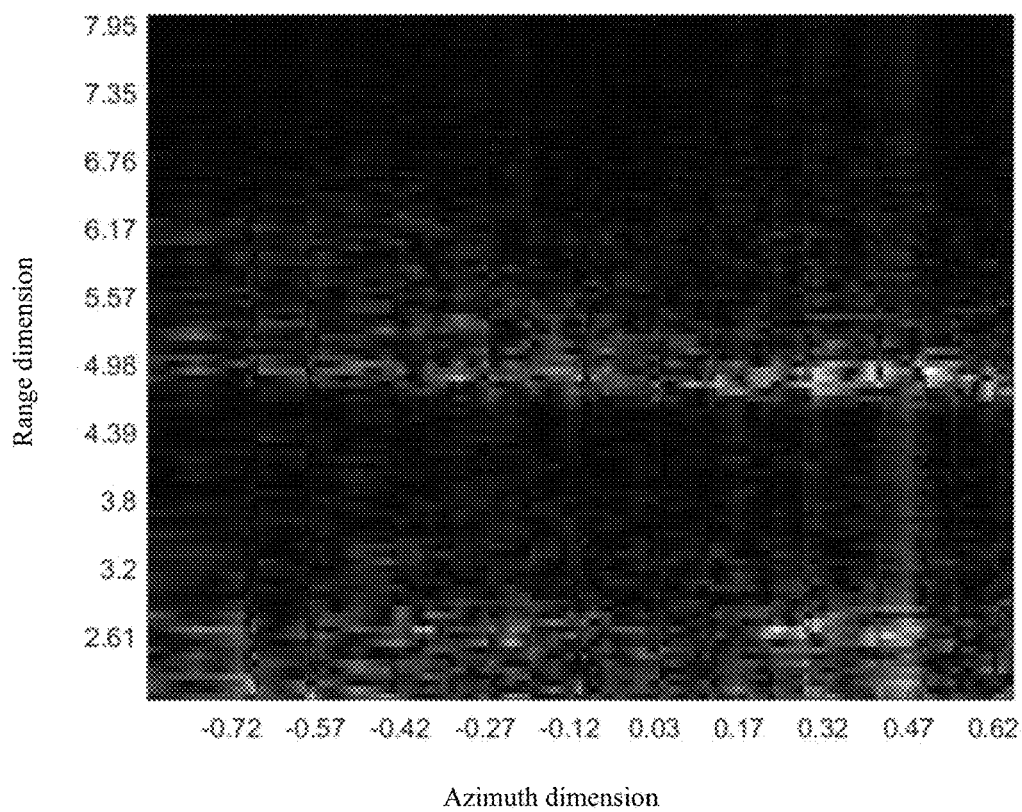
FIG. 7 illustrates an NLOS echo obtained after azimuth resampling through interpolation according to an embodiment of the disclosure.

The NLOS echo obtained after azimuth resampling through interpolation is shown in FIGS. 7, and 61 non-uniform sampling points are resampled in the azimuth direction through interpolation to 1024 uniform sampling points.

In step 3, range compensation is performed.

After azimuth resampling, the sampling points show a uniform linear array in the azimuth direction, and the next step is to compensate the radar signal in a range direction.

In a signal propagation model of the disclosure, a signal propagation path is the radar→the main scatterer→the NLOS object→the main scatterer→the radar. The purpose of the range compensation is to compensate two signal propagation segments including: the radar→the main scatterer, and the main scatterer→the radar, to make the signal propagation path become the main scatterer→the object→the main scatterer.

A specific principle of the range compensation is as follows.

The signal propagation path is divided into two segments including: the radar→the main scatterer→the radar, and the main scatterer→the object→the main scatterer; where a range between the radar and the main scatterer is denoted as $x_1$, a range between the main scatterer and the object is denoted as $x_2$, and a range from the radar to the main scatterer and then to the object is denoted as x, which is expressed in a formula 2:

$$x=x_1+x_2 \quad (2).$$

An echo s(t) of a de-frequency modulation linear frequency modulation (LFM) signal after three reflections is expressed as a formula 3:

$$s(t)=\exp(2j\pi f_c(t_1+t_2)-j\pi K_r t_1^2-j\pi K_r t_2^2+2j\pi K_r t t_1+2j\pi K_r t t_2-2j\pi K_r t_1 t_2) \quad (3)$$

where $f_c$ represents a radar carrier frequency, $K_r$ represents a modulation frequency of an LFM signal, t represents a time, $t_1$ represents a propagation time of the radar signal between the radar and the main scatterer, and $t_2$ represents a propagation time of the radar signal between the main scatterer and the object;

where $t_1$ and $x_1$ satisfies a relationship expressed in a formula 4, and $t_2$ and $x_2$ satisfies a relationship expressed in a formula 5:

$$t_1 = \frac{2x_1}{c}; \quad (4)$$

$$t_2 = \frac{2x_2}{c}, \quad (5)$$

where c represents a speed of light;

For the echo s(t), since $x_1$ is known, a range compensation term x(t) of the echo s(t) expressed in a formula 6 can be constructed:

$$x(t)=\exp(-2j\pi f_c t_1+j\pi K_r t_1^2-2j\pi K_r t t_1) \quad (6).$$

The range compensation term is multiplied with the echo in a time domain to obtain the echo after range compensation s'(t) expressed in a formula 7:

$$s'(t)=s(t)x(t)=\exp(2j\pi f_c t_2-j\pi K_r t_2^2+2j\pi K_r t t_2-2j\pi K_r t_1 t_2) \quad (7).$$

In this formula 7, there is no related term of $t_1$ excepting a complex constant term $\exp(-2j\pi K_r t_1 t_2)$, and s'(t) is consistent with the de-frequency modulation LFM signal with a time delay of $t_2$ in the form.

After the range compensation, a time delay of signal propagation between the radar and the main scatterer is compensated. Only a time delay of signal propagation between the main scatterer and the object is reserved.

Because the relay surface is not uniform, ranges (x) in a range direction from the main scatterer to the radar are not consistent. Referring to the idea of motion compensation in the imaging of synthetic aperture radar, the disclosure constructs a compensation term $h_n$ expressed in a formula 8 for an echo with an azimuth index n after range compensation:

$$h_n = \exp\left(4j\pi \frac{x_n - \bar{x}}{\lambda}\right), \quad (8)$$

where λ represents a wavelength of the radar signal, $x_n$ represents a position of the main scatterer in a range direction corresponding to the echo with the azimuth index n, and $\bar{x}$ represents an average position of the main scatterer in the range direction.

After multiplying the echo after range compensation s'(t) by the corresponding compensation term $h_n$, the main scatterer is completely compensated to a plane x=$\bar{x}$.

Figure 8A:
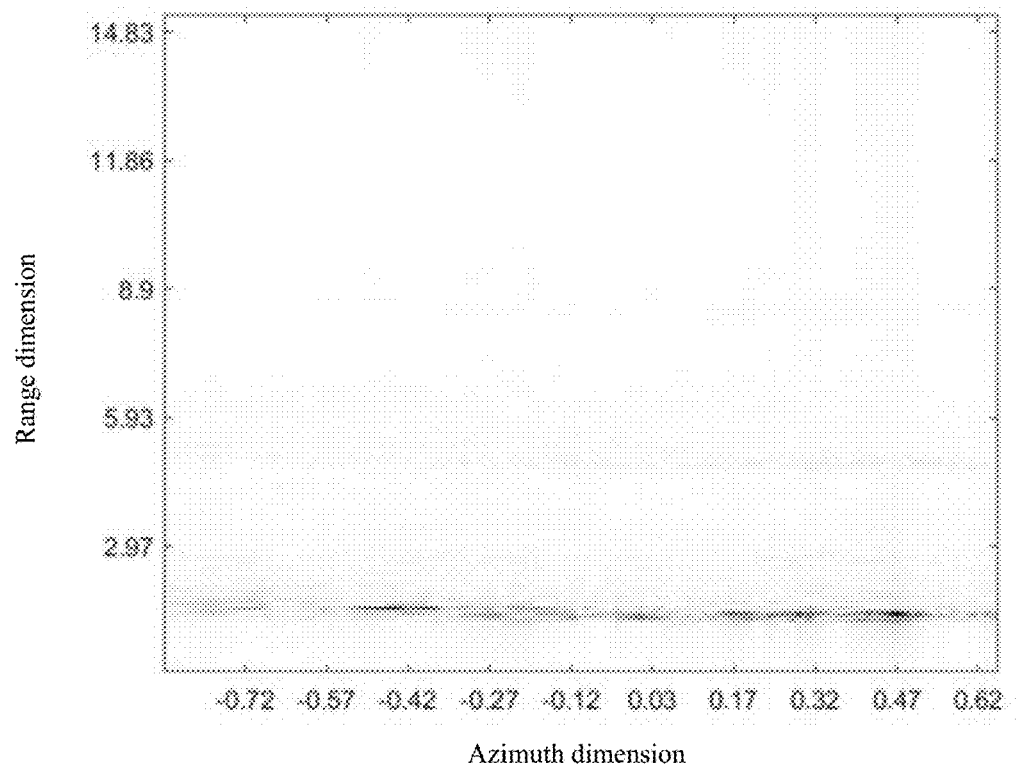
Figure 8B:
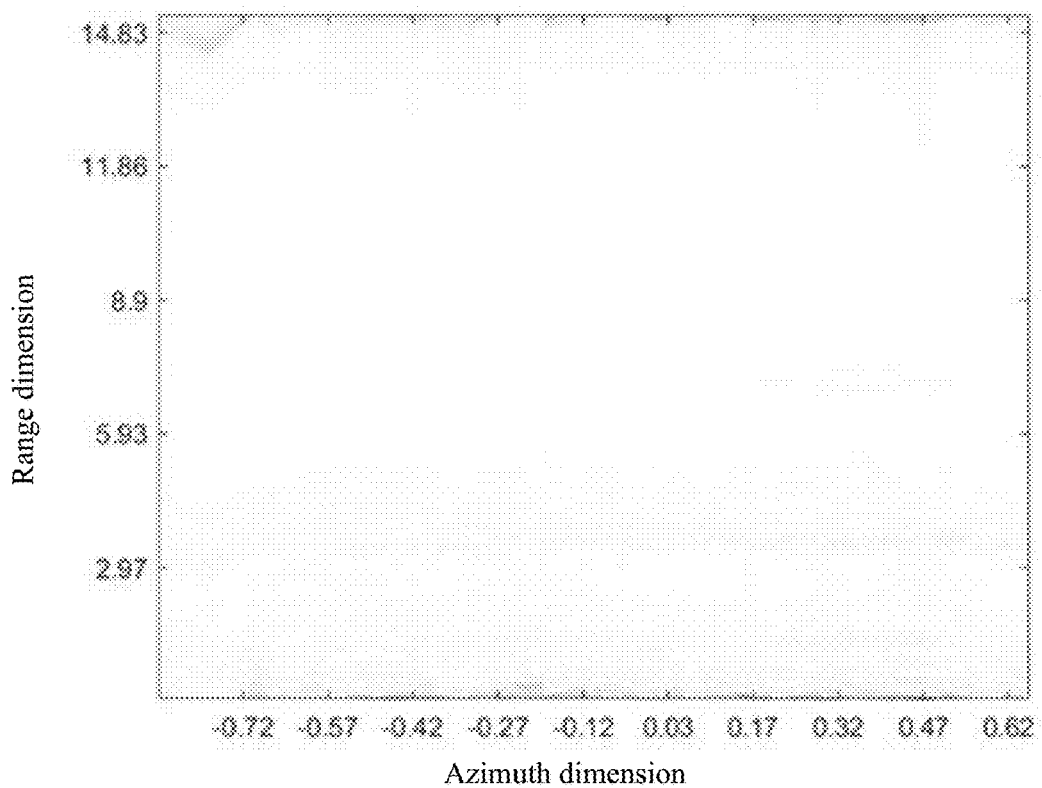
Figure 9:
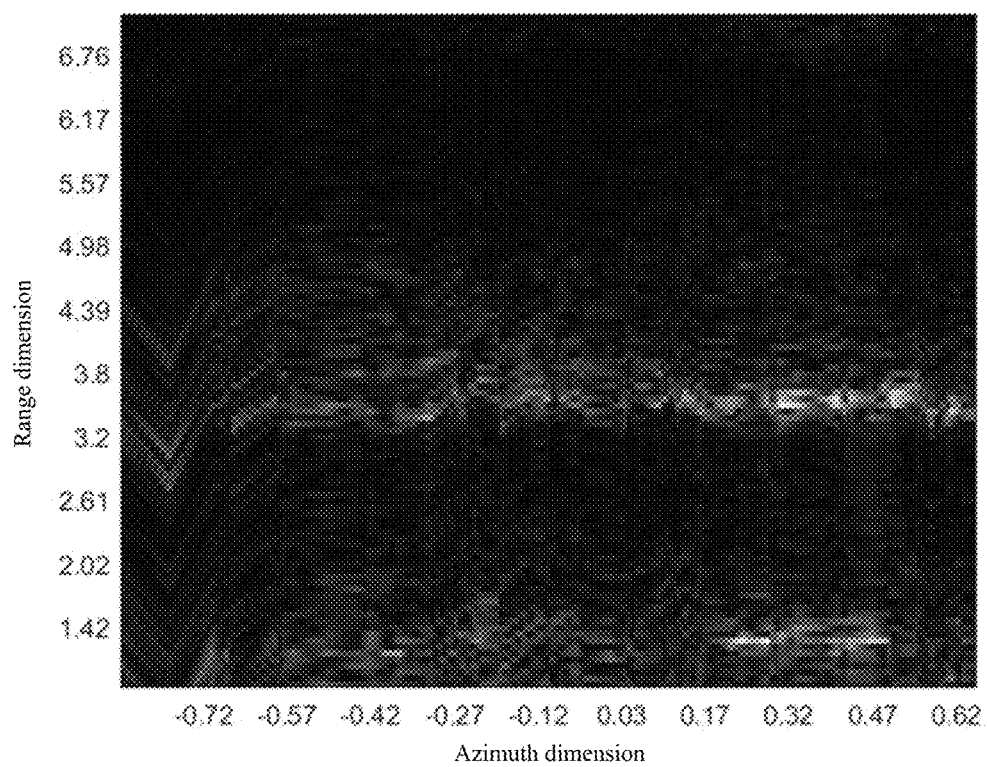
FIG. 9 illustrates the echo obtained after azimuth resampling and range compensation according to the embodiment of the disclosure, in which the echo part of the relay surface is cut off.

Based on the NLOS echo obtained after azimuth resampling through interpolation as shown in FIG. 7, the range compensation is performed thereon according to the above method. FIG. 8A illustrates the echo before range compensation and FIG. 8B illustrates the echo after the range compensation. As shown in FIG. 9, it can be seen that the main scatterer is basically compensated on the plane x=$\bar{x}$ after azimuth resampling and range compensation.

In step 4, synthetic aperture radar imaging is performed.

After the above steps 1 to 3, the NLOS echo of a phased array radar is converted into the NLOS imaging echo of a synthetic aperture radar in the azimuth direction and the range direction. At this point, a NLOS imaging problem of the phased array radar is transformed into a line-of-sight imaging problem of the synthetic aperture radar. At this time, a synthetic aperture radar imaging algorithm can be directly applied thereto.

Figure 10:
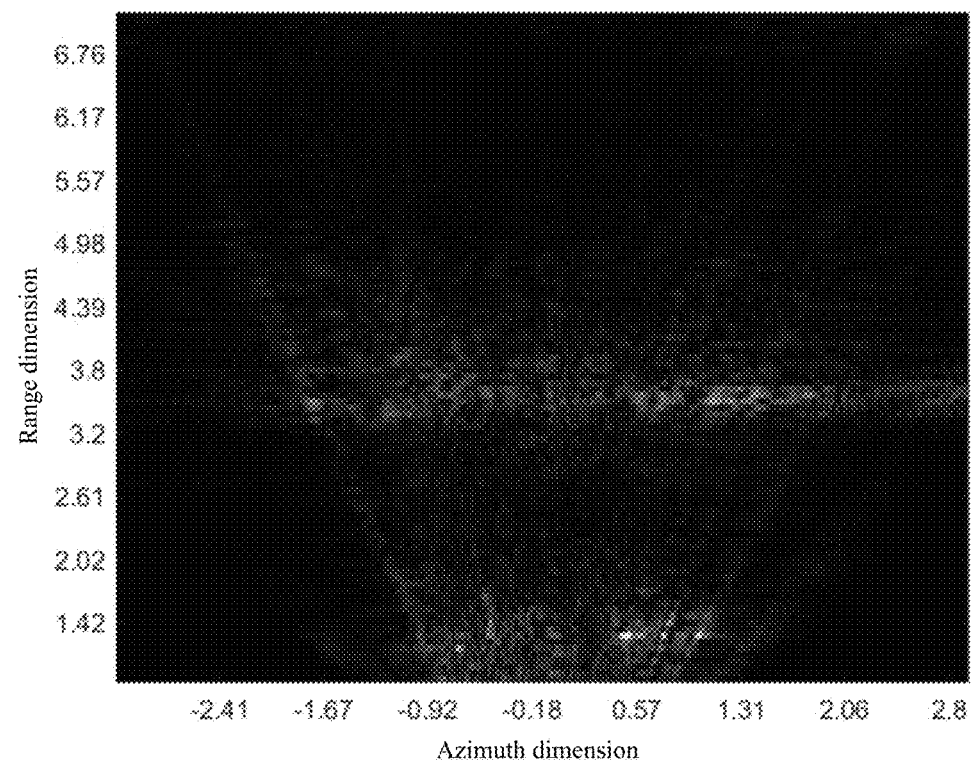
FIG. 10 illustrates a scattering aperture imaging result according to an embodiment of the disclosure.

The synthetic aperture radar imaging algorithm can adopt existing algorithm, which will not be developed in detail herein. The existing algorithm includes, but are not limited to, a range migration algorithm (RMA). The result of the synthetic aperture radar imaging based on the range migration algorithm is shown in FIG. 10, in which the object (the guide rail) is shown in a lower right corner of FIG. 10 and the iron railings and the glass walls are shown in the range.

Figure 11:
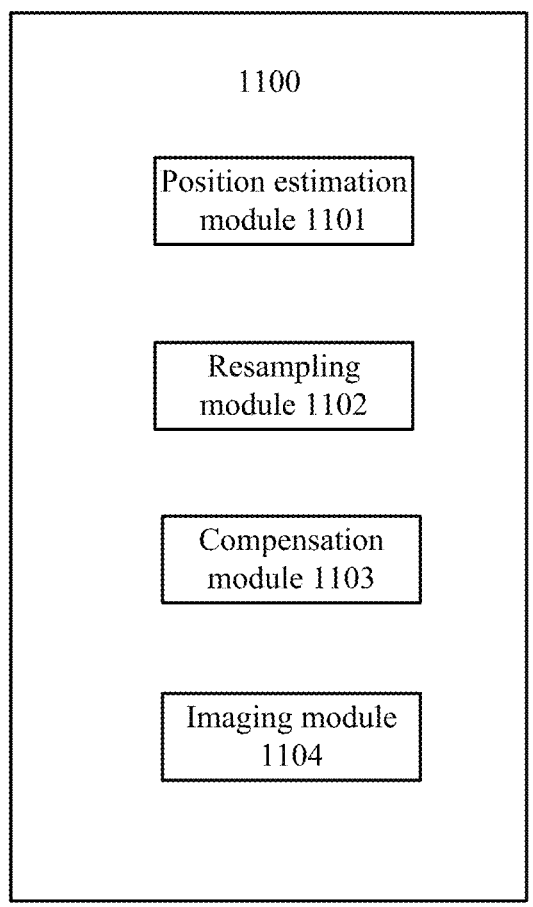
FIG. 11 illustrates a schematic structural view of a scattering aperture imaging device according to an embodiment of the disclosure.

An embodiment of the disclosure provides a scattering aperture imaging device. As shown in FIG. 11, the device 1100 includes:

a position estimation module 1101, configured to estimate a position of a main scatterer;

a resampling module 1102, configured to perform, based on the position of the main scatterer, azimuth resampling through interpolation, to obtain sampling points showing a uniform linear array in an azimuth direction;

a compensation module 1103, configured to perform range compensation on a radar signal, to make a signal propagation path of the radar signal become the main scatterer→an object→the main scatterer;

an imaging module 1104, configured to perform synthetic aperture radar imaging.

In some embodiments, the position estimation module is further configured to estimate, according to each pulse of echoes of a relay surface, an azimuth of the main scatterer relative to a radar and a range of the main scatterer relative to the radar by using a sum-difference beam method and a multiple signal classification (MUSIC) algorithm, to thereby obtain a position estimation value of the main scatterer.

In some embodiments, the compensation module is further configured to adopt a sampling interval satisfying a formula 1:

$$\Delta x < \frac{\lambda}{2} \quad (1)$$

where $\Delta x$ represents the sampling interval, and $\lambda$ represents a wavelength of the radar signal.

In some embodiments, the compensation module is further configured to:

divide the signal propagation path of the radar signal into two segments including: the radar→the main scatterer→the radar; and the main scatterer→the object→the main scatterer; where a range between the radar and the main scatterer is denoted as $x_1$, a range between the main scatterer and the object is denoted as $x_2$, and a range from the radar to the main scatterer and then to the object is denoted as x, which is expressed in a formula 2:

$$x = x_1 + x_2 \quad (2),$$

where an echo s(t) of a de-frequency modulation linear frequency modulation (LFM) signal after three reflections is expressed as a formula 3:

$$s(t) = \exp(2j\pi f_c(t_1+t_2) - j\pi K_r t_1^2 - j\pi K_r t_2^2 + 2j\pi K_r t t_1 + 2j\pi K_r t t_2 - 2j\pi K_r t_1 t_2) \quad (3),$$

where $f_c$ represents a radar carrier frequency, $K_r$ represents a modulation frequency of an LFM signal, t represents a time, $t_1$ represents a propagation time of the radar signal between the radar and the main scatterer, and $t_2$ represents a propagation time of the radar signal between the main scatterer and the object;

where $t_1$ and $x_1$ satisfies a relationship expressed in a formula 4, and $t_2$ and $x_2$ satisfies a relationship expressed in a formula 5:

$$t_1 = \frac{2x_1}{c}; \quad (4)$$

$$t_2 = \frac{2x_2}{c}, \quad (5)$$

where c represents a speed of light;

construct a range compensation term x(t) of the echo s(t), which is expressed in a formula 6:

$$x(t) = \exp(-2j\pi f_c t_1 + j\pi K_r t_1^2 - 2j\pi K_r t t_1) \quad (6),$$

multiply the range compensation term with the echo in a time domain to obtain the echo after range compensation s'(t) expressed in a formula 7:

$$s'(t) = s(t)x(t) = \exp(2j\pi f_c t_2 - j\pi K_r t_2^2 + 2j\pi K_r t t_2 - 2j\pi K_r t_1 t_2) \quad (7),$$

where the formula 7 has no related term of $t_1$ excepting a complex constant term $\exp(-2j\pi K_r t_1 t_2)$, and s'(t) is consistent with the de-frequency modulation LFM signal with a time delay of $t_2$ in the form;

construct a compensation term $h_n$ expressed in a formula 8 for an echo with an azimuth index n after range compensation:

$$h_n = \exp\left(4j\pi \frac{x_n - \bar{x}}{\lambda}\right), \quad (8)$$

where $\lambda$ represents a wavelength of the radar signal, $x_n$ represents a position of the main scatterer in a range direction corresponding to the echo with the azimuth index n, and $\bar{x}$ represents an average position of the main scatterer in the range direction;

multiply the echo after range compensation s'(t) by the corresponding compensation term $h_n$, to thereby compensate the main scatterer to a plane $x = \bar{x}$.

In some embodiments, the imaging module is further configured to: after the performing range compensation, transform a non-line-of-sight (NLOS) imaging problem of a phased array radar into a line-of-sight imaging problem of a synthetic aperture radar, and perform the synthetic aperture radar imaging by using a synthetic aperture radar imaging algorithm.

It should be noted that the device described in the above embodiment belongs to the same technical idea as the previously described method, and can achieve the same technical effect, which is not repeated here.

Embodiments of the disclosure provide a readable storage medium with one or more programs stored therein, where the one or more programs, when executed by one or more processors, is configured to implement the scattering aperture imaging method described in various embodiments above. For example, the readable storage medium is a non-transitory readable storage medium.

The above description is intended to be illustrative rather than limiting. For example, the above examples (or one or more solutions thereof) can be used in combination with each other. For example, other embodiments may be used by those skilled in the art upon reading the above description. In addition, in the above specific embodiments, various features can be combined together to simplify the disclosure. This should not be interpreted as an intention that a feature of the disclosure that is not claimed is necessary for any claim. On the contrary, the subject matter of the disclosure may be less than all features of a specific inventive embodiment. Thus, the following claims are incorporated into the detailed description herein as examples or embodiments, where each claim stands alone as a separate embodiment, and it is considered that these embodiments can be combined with each other in various combinations or permutations. The scope of protection the disclosure should be determined with reference to the appended claims along with the full range of equivalents to which these claims are entitled.

What is claimed is:

1. A scattering aperture imaging method, wherein in a situation that a phased array radar faces towards a rough relay surface, a projection of a beam main lobe of the phased array radar on the rough relay surface is regarded as a virtual aperture, and scattering of a radar signal on the virtual aperture is equivalent to scattering of the radar signal occurring at a scattering point in the virtual aperture, the virtual aperture being a scattering aperture and the scattering point being a main scatterer, and the scattering aperture imaging method comprises:

estimating a position of the main scatterer;

performing, based on the position of the main scatterer, azimuth resampling through interpolation, to obtain sampling points showing a uniform linear array in an azimuth direction;

performing range compensation on the radar signal, to measure a signal propagation path of the radar signal from the main scatterer to an object to the main scatterer; and performing synthetic aperture radar imaging.

2. The scattering aperture imaging method according to claim 1, wherein the estimating the position of the main scatterer comprises:

estimating, based on each pulse of echoes of the rough relay surface, an azimuth angle of the main scatterer relative to a radar and a range of the main scatterer relative to the radar, to thereby obtain a position estimation value of the main scatterer.

3. The scattering aperture imaging method according to claim 2, wherein the estimating, based on each pulse of echoes of the rough relay surface, an azimuth angle of the main scatterer relative to a radar and a range of the main scatterer relative to the radar, to thereby obtain a position estimation value of the main scatterer, comprises:

estimating, based on each pulse of the echoes of the rough relay surface, the azimuth angle of the main scatterer relative to the radar and the range of the main scatterer relative to the radar by using a sum-difference beam method and a multiple signal classification (MUSIC) algorithm, to thereby obtain the position estimation value of the main scatterer.

4. The scattering aperture imaging method according to claim 1, wherein the performing, based on the position of the main scatterer, azimuth resampling through interpolation, to obtain sampling points showing a uniform linear array in an azimuth direction, comprises:

performing the azimuth resampling with a sampling interval satisfying a formula 1:

$$\Delta x < \frac{\lambda}{2}, \qquad (1)$$

where $\Delta x$ represents the sampling interval, and $\lambda$ represents a wavelength of the radar signal.

5. The scattering aperture imaging method according to claim 1, wherein the performing range compensation on the radar signal, to measure the signal propagation path of the radar signal from the main scatterer to the object to the main scatterer comprises:

dividing the signal propagation path of the radar signal into two segments comprising: a first segment from the radar to the main scatterer to the radar, and a second segment from the main scatterer to the object to the main scatterer; where a range between the radar and the main scatterer is denoted as $x_1$, a range between the main scatterer and the object is denoted as $x_2$, and a range from the radar to the main scatterer and then to the object is denoted as x, which is expressed in a formula 2:

$$x = x_1 + x_2 \qquad (2),$$

where an echo s(t) of a de-frequency modulation linear frequency modulation (LFM) signal after three reflections is expressed as a formula 3:

$$s(t) = \exp(2j\pi f_c(t_1+t_2) - j\pi K_r t_1^2 - j\pi K_r t_2^2 + 2j\pi K_r t t_1 + 2j\pi K_r t t_2 - 2j\pi K_r t_1 t_2) \qquad (3),$$

where $f_c$ represents a radar carrier frequency, $K_r$ represents a modulation frequency of an LFM signal, t represents a time, $t_1$ represents a propagation time of the radar signal between the radar and the main scatterer, and $t_2$ represents a propagation time of the radar signal between the main scatterer and the object;

where $t_1$ and $x_1$ satisfies a relationship expressed in a formula 4, and $t_2$ and $x_2$ satisfies a relationship expressed in a formula 5:

$$t_1 = \frac{2x_1}{c}; \qquad (4)$$

$$t_2 = \frac{2x_2}{c}, \qquad (5)$$

where c represents a speed of light;

constructing a range compensation term x(t) of the echo s(t), which is expressed in a formula 6:

$$x(t) = \exp(-2j\pi f_c t_1 + j\pi K_r t_1^2 - 2j\pi K_r t t_1) \qquad (6),$$

multiplying the range compensation term with the echo in a time domain to obtain the echo after range compensation s'(t) expressed in a formula 7:

$$s'(t) = s(t)x(t) = \exp(2j\pi f_c t_2 - j\pi K_r t_2^2 + 2j\pi K_r t t_2 - 2j\pi K_r t_1 t_2) \qquad (7),$$

where the formula 7 has no related term of $t_1$ excepting a complex constant term $\exp(-2j\pi K_r t_1 t_2)$, and s'(t) is consistent with the de-frequency modulation LFM signal with a time delay of $t_2$ in the form;

constructing a compensation term $h_n$ expressed in a formula 8 for an echo with an azimuth index n after range compensation:

$$h_n = \exp\left(4j\pi \frac{x_n - \bar{x}}{\lambda}\right), \qquad (8)$$

where $\lambda$ represents a wavelength of the radar signal, $x_n$ represents a position of the main scatterer in a range direction corresponding to the echo with the azimuth index n, and $\bar{x}$ represents an average position of the main scatterer in the range direction;

multiplying the echo after range compensation s'(t) by the corresponding compensation term $h_n$, to thereby compensate the main scatterer to a plane $x = \bar{x}$.

6. The scattering aperture imaging method according to claim 5, wherein after the performing range compensation, a non-line-of-sight (NLOS) imaging problem of the phased array radar is transformed into a line-of-sight imaging problem of a synthetic aperture radar, and wherein the performing synthetic aperture radar imaging comprises: performing the synthetic aperture radar imaging by using a synthetic aperture radar imaging algorithm.

7. A multi-user modulation classification system, comprising:
a memory with a computer program stored therein; and
a processor, configured to execute the computer program to implement the scattering aperture imaging method according to claim 1.

8. A non-transitory readable storage medium with one or more programs stored therein, wherein the one or more programs, when executed by one or more processors, is configured to implement the scattering aperture imaging method according to claim 1.

9. A scattering aperture imaging method device, comprising:
a position estimation module, configure to estimate a position of a main scatterer;
a resampling module, configured to perform, based on the position of the main scatterer, azimuth resampling through interpolation, to obtain sampling points showing a uniform linear array in an azimuth direction;
a compensation module, configured to perform range compensation on a radar signal, to measure a signal propagation path of the radar signal from the main scatterer to an object to the main scatterer; and
an imaging module, configured to perform synthetic aperture radar imaging.

10. The scattering aperture imaging device according to claim 9, wherein the compensation module is further configured to:
divide the signal propagation path of the radar signal into two segments comprising: a first segment from the radar to the main scatterer to the radar; and a second segment from the main scatterer to the object to the main scatterer; where a range between the radar and the main scatterer is denoted as $x_1$, a range between the main scatterer and the object is denoted as $x_2$, and a range from the radar to the main scatterer and then to the object is denoted as x, which is expressed in a formula 2:

$$x = x_1 + x_2 \quad (2),$$

where an echo s(t) of a de-frequency modulation linear frequency modulation (LFM) signal after three reflections is expressed as a formula 3:

$$s(t) = \exp(2j\pi f_c(t_1+t_2) - j\pi K_r t_1^2 - j\pi K_r t_2^2 + 2j\pi K_r t t_1 + 2j\pi K_r t t_2 - 2j\pi K_r t_1 t_2) \quad (3),$$

where $f_c$ represents a radar carrier frequency, $K_r$ represents a modulation frequency of an LFM signal, t represents a time, $t_1$ represents a propagation time of the radar signal between the radar and the main scatterer, and $t_2$ represents a propagation time of the radar signal between the main scatterer and the object;

where $t_1$ and $x_1$ satisfies a relationship expressed in a formula 4, and $t_2$ and $x_2$ satisfies a relationship expressed in a formula 5:

$$t_1 = \frac{2x_1}{c}; \quad (4)$$

$$t_2 = \frac{2x_2}{c}, \quad (5)$$

where c represents a speed of light;
construct a range compensation term x(t) of the echo s(t), which is expressed in a formula 6:

$$x(t) = \exp(-2j\pi f_c t_1 + j\pi K_r t_1^2 - 2j\pi K_r t t_1) \quad (6),$$

multiply the range compensation term with the echo in a time domain to obtain the echo after range compensation s'(t) expressed in a formula 7:

$$s'(t) = s(t)x(t) = \exp(2j\pi f_c t_2 - j\pi K_r t_2^2 + 2j\pi K_r t t_2 - 2j\pi K_r t_1 t_2) \quad (7),$$

where the formula 7 has no related term of $t_1$ excepting a complex constant term $\exp(-2j\pi K_r t_1 t_2)$, and s'(t) is consistent with the de-frequency modulation LFM signal with a time delay of $t_2$ in the form;
construct a compensation term $h_n$ expressed in a formula 8 for an echo with an azimuth index n after range compensation:

$$h_n = \exp\left(4j\pi \frac{x_n - \bar{x}}{\lambda}\right), \quad (8)$$

where $\lambda$ represents a wavelength of the radar signal, $x_n$ represents a position of the main scatterer in a range direction corresponding to the echo with the azimuth index n, and $\bar{x}$ represents an average position of the main scatterer in the range direction;
multiply the echo after range compensation s'(t) by the corresponding compensation term $h_n$, to thereby compensate the main scatterer to a plane $x=\bar{x}$.

* * * * *